United States Patent
Chakladar

(10) Patent No.: US 9,613,618 B2
(45) Date of Patent: Apr. 4, 2017

(54) APPARATUS AND METHOD FOR RECOGNIZING VOICE AND TEXT

(71) Applicant: Samsung Electronics Co., Ltd., Gyeonggi-do (KR)

(72) Inventor: Subhojit Chakladar, Gyeonggi-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/324,013

(22) Filed: Jul. 3, 2014

(65) Prior Publication Data

US 2015/0012260 A1    Jan. 8, 2015

(30) Foreign Application Priority Data

Jul. 4, 2013    (KR) .................. 10-2013-0078207

(51) Int. Cl.
*G10L 15/00*    (2013.01)
*G10L 13/00*    (2006.01)
(Continued)

(52) U.S. Cl.
CPC ........ *G10L 15/005* (2013.01); *G01C 21/3664* (2013.01); *G06F 17/275* (2013.01); *G10L 2015/226* (2013.01)

(58) Field of Classification Search
USPC ....... 704/235, 243, 3, 4, 258, 260, 261, 270, 704/275
See application file for complete search history.

(56) References Cited

U.S. PATENT DOCUMENTS 5,806,033 A * 9/1998 Lyberg ............... G10L 15/1807
                                                                704/211
6,275,789 B1 * 8/2001 Moser .................. G06F 17/271
                                                                704/2
(Continued)

FOREIGN PATENT DOCUMENTS

EP    1264301      12/2002
EP    1418570 A1   5/2004
(Continued)

OTHER PUBLICATIONS

Badino et al., "Approach to TTS Reading of Mixed-Language Texts", Proc. of 5th ISCA Tutorial and Research Workshop on Speech Synthesis, Pittsburg, PA, 2004.*

(Continued)

*Primary Examiner* — Edgar Guerra-Erazo

(57) ABSTRACT

A method for recognizing a voice includes receiving, as an input, a voice involving multiple languages, recognizing a first voice of the voice by using a voice recognition algorithm matched to a preset primary language, identifying the preset primary language and a non-primary language different from the preset primary language, which are included in the multiple languages, determining a type of the non-primary language based on context information, recognizing a second voice of the voice in the non-primary language by applying a voice recognition algorithm, which is matched to the non-primary language of the determined type, to the second voice, and outputting a result of recognizing the voice which is based on a result of recognizing the first voice and a result of recognizing the second voice.

18 Claims, 12 Drawing Sheets

(51) Int. Cl.
*G10L 21/00* (2013.01)
*G01C 21/36* (2006.01)
*G06F 17/27* (2006.01)
*G10L 15/22* (2006.01)

(56) References Cited

U.S. PATENT DOCUMENTS

| | | | | |
|---|---|---|---|---|
| 7,593,842 B2* | 9/2009 | Rousseau | ............... | G06F 17/28 704/2 |
| 7,716,050 B2 | 5/2010 | Gillick et al. | | |
| 8,126,703 B2* | 2/2012 | Runge | ............... | G06F 17/289 704/3 |
| 8,788,256 B2* | 7/2014 | Chen | ............... | G10L 15/187 434/156 |
| 8,788,271 B2* | 7/2014 | James | ............... | G06F 9/4443 704/270 |
| 2002/0161580 A1* | 10/2002 | Taylor | ............... | G10L 15/005 704/235 |
| 2004/0122678 A1* | 6/2004 | Rousseau | ............... | G06F 17/28 704/277 |
| 2005/0108017 A1 | 5/2005 | Esser et al. | | |
| 2005/0187758 A1 | 8/2005 | Khasin | | |
| 2006/0136220 A1* | 6/2006 | Gurram | ............... | G10L 15/005 704/275 |
| 2006/0136221 A1* | 6/2006 | James | ............... | G06F 9/4443 704/275 |
| 2007/0124202 A1* | 5/2007 | Simons | ............... | G06Q 30/02 705/346 |
| 2007/0299666 A1* | 12/2007 | Li | ............... | G10L 15/005 704/236 |
| 2008/0147404 A1* | 6/2008 | Liu | ............... | G10L 17/26 704/256.2 |
| 2010/0017193 A1* | 1/2010 | Runge | ............... | G06F 17/289 704/8 |
| 2010/0211376 A1* | 8/2010 | Chen | ............... | G10L 15/187 704/2 |
| 2011/0035219 A1* | 2/2011 | Kadirkamanathan | . | G10L 15/005 704/239 |
| 2011/0295590 A1* | 12/2011 | Lloyd | ............... | G10L 15/065 704/8 |
| 2012/0010886 A1 | 1/2012 | Razavilar | | |

FOREIGN PATENT DOCUMENTS

| | | |
|---|---|---|
| EP | 1693828 A1 | 8/2006 |
| EP | 1975923 A1 | 10/2008 |
| EP | 2192575 A1 | 6/2010 |
| JP | 2001-228891 A | 8/2001 |
| WO | WO 2009/156815 A1 | 12/2009 |

OTHER PUBLICATIONS

Kikui et al., "Cross-lingual Information Retrieval on the WWW", Multilinguality in Software Engineering: Al Contribution (in conjunction with ECAI 96). 1996. lap. 1-6.*

Extended European Search Report dated Nov. 26, 2014 in connection with European Patent Application No. 14175597.5-1901; 12 pages.

\* cited by examiner

APPARATUS AND METHOD FOR RECOGNIZING VOICE AND TEXT

CROSS-REFERENCE TO RELATED APPLICATION(S) AND CLAIM OF PRIORITY

The present application is related to and claims priority under 35 U.S.C. §119(a) to Korean Patent Application Serial No. 10-2013-0078207, which was filed in the Korean Intellectual Property Office on Jul. 4, 2013, the contents of which are incorporated herein by reference.

TECHNICAL FIELD

The present disclosure relates generally to an apparatus and a method for recognizing a voice, and more particularly, to an apparatus and a method for recognizing a voice involving multiple languages.

BACKGROUND

With the advancement of transportation and communication, there is a rapid increase in encountering a voice in a foreign language. However, those who are not proficient in a foreign language can experience difficulty in hearing and understanding the foreign language. In this regard, a method for recognizing a voice in a foreign language and converting a result of recognizing the voice in the foreign language into text, has been developed and progressed.

In a method for recognizing a voice according to the related art, an input voice is segmented in a unit of phoneme, and then each segmented phoneme is compared with a database and thereby a determination is made as to which text or word a voice is matched to.

Meanwhile, because there frequently occurs a case where a person of a particular nationality resides in a foreign country, it is necessary to process a voice involving multiple languages together. For example, there may occur a case where a person of a particular nationality mostly uses the language of the particular nationality but mixes in words from a language used in another country. Accordingly, it is required to develop an apparatus and a method for recognizing a voice involving multiple languages.

In a method for recognizing a voice involving multiple languages according to the related art, for example, words or idiomatic sentences for communication that languages of various countries have in common are defined as codes, and then languages of various countries are mapped to the codes, respectively. In this regard, the above method is disadvantageous in that, as long as types of languages different from a language set to be a primary language are not specified, mapping must be performed on all languages and thus the amount of calculations rapidly increases.

Particularly, the method for recognizing a voice, which cannot be performed in real time, has a low degree of utilization, and thus the reduction of the amount of calculations in the method for recognizing a voice is one of the important requirements for developing a technology.

Therefore, there is a need for an apparatus and a method capable of quickly identifying the type of a non-primary language different from a primary language and recognizing a voice involving multiple languages in real time when the voice involving the primary language and the non-primary language is recognized.

The above information is presented as background information only to assist with an understanding of the present disclosure. No assertion is made as to whether any of the above might be applicable as prior art with regard to the present disclosure.

SUMMARY

To address the above-discussed deficiencies, it is a primary object to provide an apparatus and a method capable of quickly identifying the type of a non-primary language different from a primary language and recognizing a voice involving multiple languages in real time when the voice involving the primary language and the non-primary language is recognized.

In accordance with an aspect of the present disclosure, a method of recognizing a voice is provided. The method includes receiving, as an input, a voice involving multiple languages, recognizing a first voice of the voice by using a voice recognition algorithm matched to a preset primary language, identifying the preset primary language and a non-primary language different from the preset primary language, which are included in the multiple languages, determining a type of the non-primary language based on context information; recognizing a second voice of the voice in the non-primary language by applying a voice recognition algorithm, which is matched to the non-primary language of the determined type, to the second voice, and outputting a result of recognizing the voice which is based on a result of recognizing the first voice and a result of recognizing the second voice.

In accordance with another aspect of the present disclosure, an apparatus that recognizes a voice is provided. The apparatus includes a microphone that receives, as an input, a voice involving multiple languages including a preset primary language and a non-primary language different from the preset primary language, a storage unit that stores a voice recognition algorithm matched to the preset primary language and a voice recognition algorithm matched to the non-primary language, a controller that recognizes a first voice of the voice by using the voice recognition algorithm matched to the preset primary language, identifies the preset primary language and the non-primary language different from the preset primary language which are included in the multiple languages, determines a type of the non-primary language based on context information, and recognizes a second voice of the voice in the non-primary language by applying a voice recognition algorithm, which is matched to the non-primary language of the determined type, to the second voice; and a display unit that outputs a result of recognizing the voice which is based on a result of recognizing the first voice and a result of recognizing the second voice.

In accordance with still another aspect of the present disclosure, a method of recognizing text is provided. The method includes receiving, as an input, text including characters of multiple languages, recognizing first text of the text by using a text recognition algorithm matched to a preset primary language, identifying the preset primary language and a non-primary language different from the preset primary language, which are included in the multiple languages, determining a type of the non-primary language based on context information, recognizing second text of the text in the non-primary language by applying a text recognition algorithm, which is matched to the non-primary language of the determined type, to the second text, converting a result of recognizing the text, which is based on a result of recognizing the first text and a result of recognizing the second text, into a voice; and outputting the converted voice.

In accordance with yet another aspect of the present disclosure, an apparatus that recognizes text is provided. The apparatus includes an input unit that receives, as an input, text including characters of multiple languages, a controller that recognizes first text of the text by using a text recognition algorithm matched to a preset primary language, identifies the preset primary language and a non-primary language different from the preset primary language, which are included in the multiple languages, determines a type of the non-primary language based on context information, recognizes second text of the text in the non-primary language by applying a text recognition algorithm, which is matched to the non-primary language of the determined type, to the second text, and converts a result of recognizing the text, which is based on a result of recognizing the first text and a result of recognizing the second text, into a voice; and an output unit that outputs the converted voice.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Figure 1:
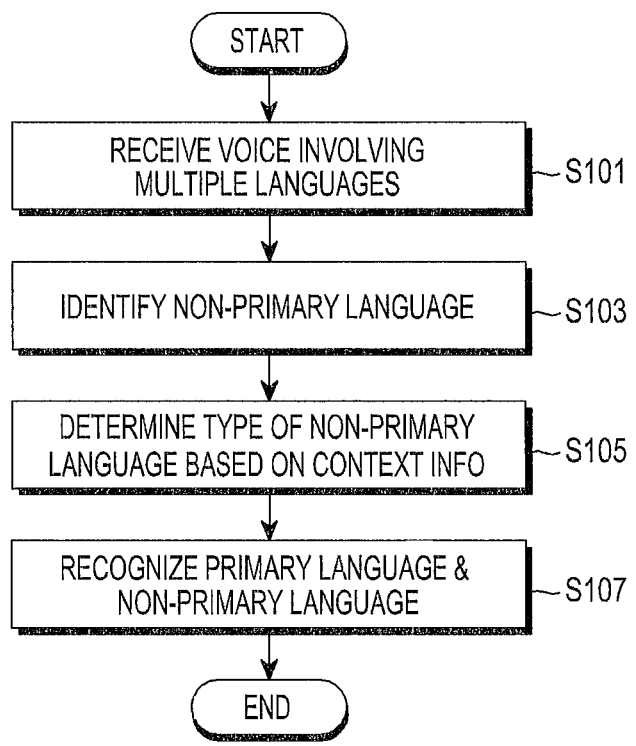
FIG. 1 is a flowchart illustrating a method for recognizing a voice according to an embodiment of the present disclosure.

FIG. 1 is a flowchart illustrating a method for recognizing a voice according to an embodiment of the present disclosure. Also, FIGS. 2A to 2D are conceptual views illustrating a method for recognizing a voice according to an embodiment of the present disclosure. The method for recognizing a voice as illustrated in FIG. 1 will be described in more detail below with reference to FIGS. 2A to 2D.

Referring to FIG. 1, an apparatus for recognizing a voice receives, as input, a voice involving multiple languages, in step S101. The multiple languages may include a primary language and a non-primary language. Here, the primary language may be a language which occupies a relatively large part of an input voice. In contrast, the non-primary language is in a type different from that of the primary language, and may be a language which occupies a relatively small part of an input voice. The primary language occupies a relatively large part of an input voice, and thus is set to have the type of a language to be recognized in the apparatus for recognizing a voice. In other words, a language which has previously been set for voice recognition in the apparatus for recognizing a voice may be referred to as the "primary language." A language which has not previously been set as a language to be recognized in the apparatus for recognizing a voice may be referred to as a "non-primary language."

In the present example, a situation is considered in which a user who mostly speaks a first language also intermittently speaks a second language. Because the user mostly speaks the first language, the first language is set as a language to be recognized, in the apparatus for recognizing a voice. In contrast, the second language is relatively intermittently spoken, and thus is not set to be a language to be recognized. Accordingly, the first language is a primary language, and the second language is a non-primary language.

Figure 2A:
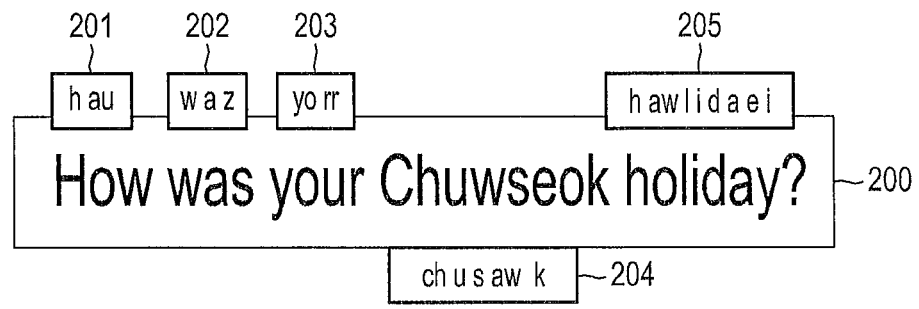
FIGS. 2A to 2D are conceptual views illustrating a process for identifying a voice involving a primary language and a non-primary language, according to an embodiment of the present disclosure.

FIG. 2A is a conceptual view illustrating a voice involving a primary language and a non-primary language, according to an embodiment of the present disclosure.

FIG. 2A illustrates a situation in which a voice 200 expressing "How was your Chuseok holiday?" is input. In an embodiment of the present disclosure as illustrated in FIG. 2A, the English words "How," "was," "your" and "holiday" refer to a primary language, and the Korean word "Chuseok" refers to a non-primary language. Specifically, the apparatus for recognizing a voice sets English as the primary language, but does not perform a special setting for Korean.

Referring again to FIG. 1, in step S103, the apparatus for recognizing a voice identifies a non-primary language, from the input voice 200. For example, the apparatus for recognizing a voice segments the voice 200, which has been received as illustrated in FIG. 2A, in a unit of phoneme by using a method for recognizing an acoustic model. The apparatus for recognizing a voice can segment the voice 200 into the phonemes "h," "au," "w," "a," "z," "yo," "rr," "ch," "u," "s," "aw," "k," "h," "aw," "l," "i," "d," "e" and "i."

Otherwise, the apparatus for recognizing a voice can segment the input voice 200 in a unit of word by using a method for recognizing a language model. The apparatus for recognizing a voice can segment the voice 200 into a first word 201 to a fifth word 205.

Those skilled in the art will easily understand that the technical idea of the present disclosure is not limited by the type of a method for recognizing an acoustic model or a language model.

The apparatus for recognizing a voice matches each segmented phoneme with a phoneme database, and thereby determines a similarity therebetween. For example, the apparatus for recognizing a voice identifies a matching relation between an individual phoneme or a phoneme set 211 and a phoneme database 212, as illustrated in FIG. 2B.

Figure 2B:
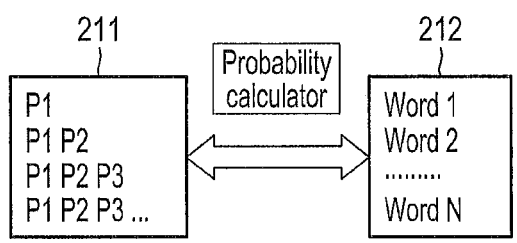

Referring to FIG. 2B, the apparatus for recognizing a voice identifies a matching relation between a first phoneme P1 and a first word Word 1 to an n-th word Word N among the phoneme database 212, and thereby determines a similarity therebetween. Also, the apparatus for recognizing a voice adds a second phoneme P2 to the first phoneme P1 and identifies a matching relation between the second phoneme P2 added to the first phoneme P1 and the first word Word 1 to the N-th word Word N, and thereby determines a similarity therebetween. In a manner similar to that as described above, the apparatus for recognizing a voice can match the at least one phoneme 211 with the phoneme database 212, and thereby can determine a similarity therebetween. The apparatus for recognizing a voice determines that a word having a similarity greater than or equal to a preset threshold is a recognized word. In this regard, when there are multiple words each having a similarity greater than or equal to the preset threshold, the apparatus for recognizing a voice determines that a word having the highest similarity among the multiple words is a recognized word.

Figure 2C:
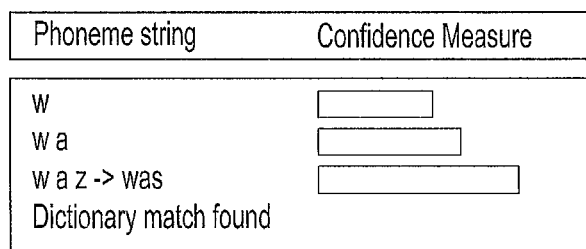

FIG. 2C is a conceptual view illustrating a process for recognizing the phonemes "w," "a" and "z" as the word "was." Referring to FIG. 2C, the apparatus for recognizing a voice detects a result of matching and a similarity of the segmented phoneme "w," detects a result of matching and a similarity of the phonemes "w" and "a," and detects a result of matching and a similarity of the three phonemes "w," "a" and "z." As illustrated in FIG. 2C, the apparatus for recognizing a voice identifies that a similarity between the three phonemes "w," "a" and "z" and the word "was" of the phoneme database 212 has the largest value and is greater than or equal to the threshold. Accordingly, the apparatus for recognizing a voice recognizes that the three phonemes "w," "a" and "z" correspond to the word "was."

Figure 2D:
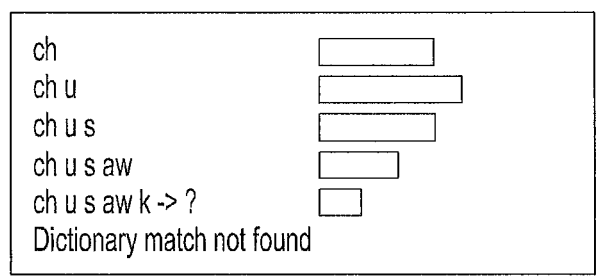

Meanwhile, FIG. 2D is a conceptual view illustrating a process for recognizing "Chuseok." Referring to FIG. 2D, the apparatus for recognizing a voice detects a result of matching and a similarity of the segmented phoneme "ch," detects a result of matching and a similarity of the phonemes "ch" and "u," detects a result of matching and a similarity of the phonemes "ch," "u" and "s," detects a result of matching and a similarity of the phonemes "ch," "u," "s" and "aw," and detects a result of matching and a similarity of the phonemes "ch," "u," "s," "aw" and "k." In this regard, the apparatus for recognizing a voice can identify that a word matched to each of the phoneme items (i.e., "ch," "ch" and "u," "ch," "u" and "s," "ch," "u," "s" and "aw," and "ch," "u," "s," "aw" and "k") does not exist. Otherwise, the apparatus for recognizing a voice can identify that each of the similarities is less than the preset threshold. Accordingly, the apparatus for recognizing a voice determines that a word corresponding to "Chuseok" does not exist. The above-described process can be named "confidence measurement."

In this regard, the apparatus for recognizing a voice can perform separation. In an embodiment of the present disclosure as illustrated in FIGS. 2C and 2D, the apparatus for recognizing a voice identifies that the three phonemes "w," "a" and "z" correspond to the word "was" and a word corresponding to the phonemes "ch," "u," "s," "aw" and "k" does not exist. Accordingly, the apparatus for recognizing a voice identifies that the three phonemes "w," "a" and "z" belong to English and the phonemes "ch," "u," "s," "aw" and "k" belong to a language other than English. The apparatus for recognizing a voice determines that the phonemes "ch," "u," "s," "aw" and "k" belong to a non-primary language, determines that the remaining phonemes except for the phonemes "ch," "u," "s," "aw" and "k" belong to a primary language and then separates the remaining phonemes from the phonemes "ch," "u," "s," "aw" and "k," and identifies the non-primary language.

Meanwhile, the above-described process can be similarly applied to a case where a voice involving three or more different languages is received. In the present example, the apparatus for recognizing a voice receives, as input, a voice involving a first language, a second language and a third language. The apparatus for recognizing a voice sets the first language as a primary language. The apparatus for recognizing a voice determines a similarity of a phoneme or a phoneme set based on a voice recognition algorithm matched to the first language. The apparatus for recognizing a voice determines that a phoneme or a phoneme set having a similarity less than a first threshold belongs to a language different from the first language. Also, the apparatus for recognizing a voice determines a similarity of a phoneme or a phoneme set based on a voice recognition algorithm matched to the second language. The apparatus for recognizing a voice determines that a phoneme or a phoneme set having a similarity less than a second threshold phonemes belongs to a language different from the second language. Also, the apparatus for recognizing a voice recognizes the remaining voice by using a voice recognition algorithm matched to the third language. As described above, the apparatus for recognizing a voice recognizes a voice involving the multiple languages.

Referring again to FIG. 1, in step S105, the apparatus for recognizing a voice determines the type of the non-primary language based on context information. In an embodiment of the present disclosure as illustrated in FIG. 1, the context information includes at least one of whether the name of a country exists within a voice, information on a place where the apparatus for recognizing a voice is located, dialogue history information, and updated non-primary language database. For example, when it is determined that a place where the apparatus for recognizing a voice is located is Korea, the apparatus for recognizing a voice determines that the type of non-primary language is Korean. A scenario for determining the type of a non-primary language matched to each context information will be described in more detail below.

Meanwhile, the apparatus for recognizing a voice can display the determined type of the non-primary language. The user can identify the type of the non-primary language, and can input a positive or negative feedback on the identified type of the non-primary language. The apparatus for recognizing a voice can determine the type of non-primary language in response to the input feedback. For example, when the user inputs a positive feedback, the apparatus for recognizing a voice can finalize the determined type of the non-primary language. In contrast, when the user inputs a negative feedback, the apparatus for recognizing a voice can determine that the type of non-primary language is another language. Otherwise, the apparatus for recognizing a voice can provide a User Interface (UI) which provides a list of other languages and allows the user to select the type of non-primary language.

In step S107, the apparatus for recognizing a voice recognizes the primary language by using a voice recognition algorithm of a preset type, and recognizes the non-primary language by using an algorithm for recognizing a voice in the determined type of the language. For example, the apparatus for recognizing a voice applies an algorithm for recognizing a voice in Korean to the phonemes "ch," "u," "s," "aw" and "k," and thereby recognizes that the phonemes "ch," "u," "s," "aw" and "k" correspond to the word "Chuseok."

The apparatus for recognizing a voice determines the type of non-primary language based on context information, so that it can significantly reduce the amount of calculations which are required to match a non-primary language with all languages in order to recognize the non-primary language.

Figure 3A:
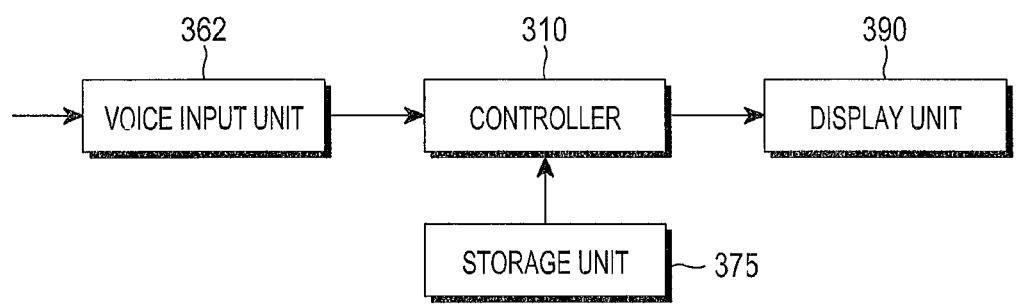
FIGS. 3A and 3B are block diagrams each illustrating a configuration of an apparatus for recognizing a voice according to various embodiments of the present disclosure.

FIG. 3A is a block diagram illustrating a configuration of an apparatus for recognizing a voice, according to an embodiment of the present disclosure.

Referring to FIG. 3A, the apparatus 300 for recognizing a voice includes a microphone 362, a controller 310, a storage unit 375, and a display unit 390.

The microphone 362 receives, as input, a voice involving multiple languages, and converts the input voice into an electrical signal and outputs the electrical signal. For example, the microphone 362 performs Analog-to-Digital (A/D) conversion, and converts an input analog voice into a digital electrical signal and outputs the digital electrical signal.

The controller 310 separates an input voice into a primary language and a non-primary language, and identifies the non-primary language. For example, the controller 310 segments an input voice in a unit of phoneme. The controller 310 reads an algorithm for recognizing a voice in a language of a type, which is set as the primary language, and a database of phonemes of the primary language, from the storage unit 375. The controller 310 recognizes at least one phoneme by matching the at least one phoneme with one word of the primary language. Meanwhile, the controller 310 determines that a phoneme or a phoneme set which is not matched with a word of the primary language, namely, which does not exist in the database of phonemes of the primary language, belongs to the non-primary language. As described above, the controller 310 identifies the primary language and the non-primary language, with respect to a voice received as input from the microphone 362.

Also, the controller 310 determines the type of non-primary language based on context information, and recognizes the non-primary language by using a voice recognition algorithm matched to the determined type of the non-primary language.

The controller 310 adds a result of recognizing the primary language to a result of recognizing the non-primary language, and controls the display unit 390 to display the recognition results. Otherwise, in the case of Text-To-Speech (TTS), the controller 310 can control the speaker 363 to output the recognition results in the form of voice.

Figure 3B:
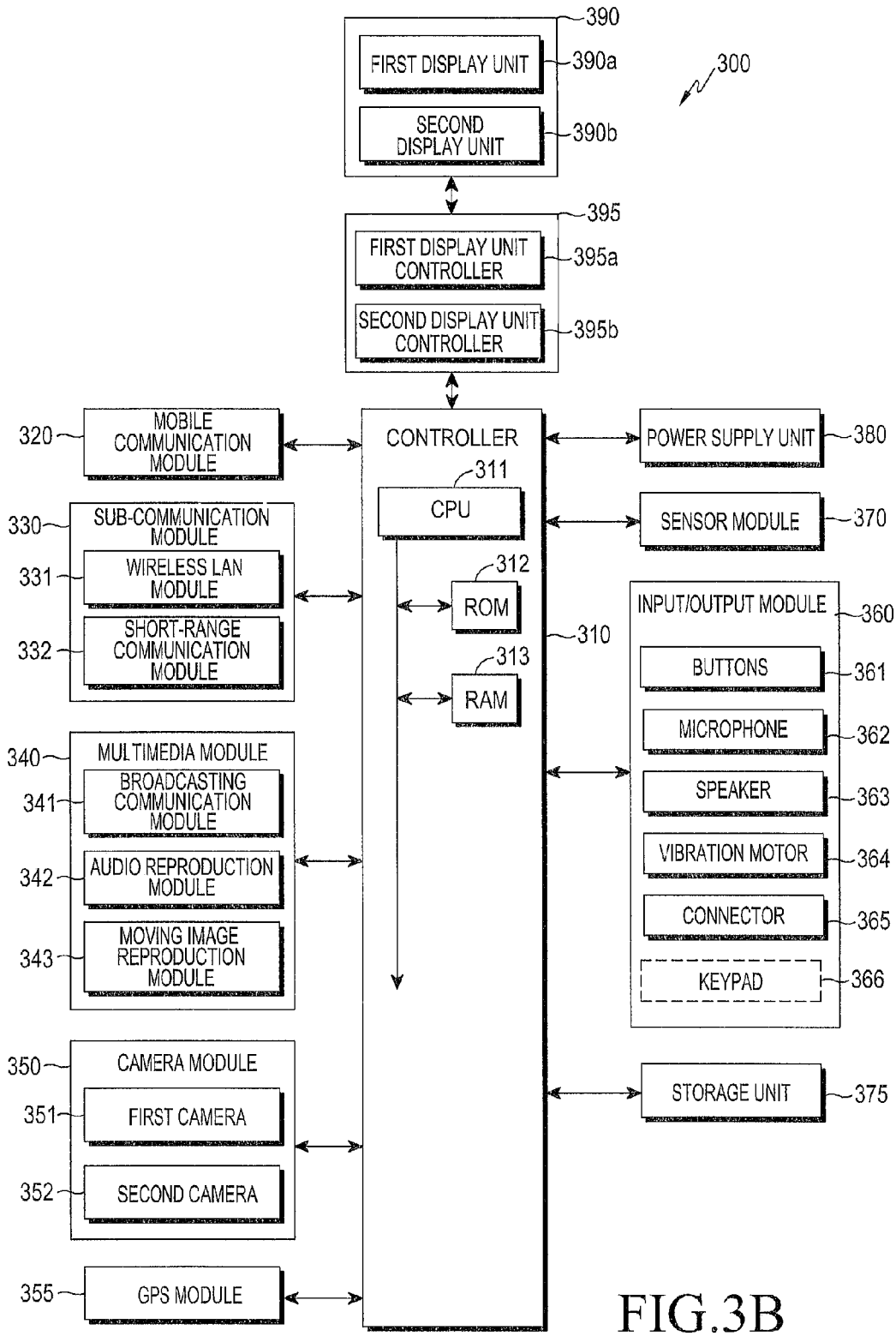

FIG. 3B is a more detailed block diagram illustrating a configuration of an apparatus for recognizing a voice according to an embodiment of the present disclosure.

Referring to FIG. 3B, the apparatus 300 for recognizing a voice includes a controller 310, a mobile communication module 320, a sub-communication module 330, a multimedia module 340, a camera module 350, a Global Positioning System (GPS) module 355, an input/output module 360, a sensor module 370, a storage unit 375, and a power supply unit 380, a display unit 390, and a display unit controller 395. In this embodiment of the present disclosure, particularly, the display unit 390 is implemented as a touch screen.

According to embodiments of the present disclosure, the apparatus 300 for recognizing a voice can be connected to an external device (not shown) by using the mobile communication module 320, the sub-communication module 330 and a connector 365. Examples of the external devices can include another device (not shown), a mobile phone (not shown), a smart phone (not shown), a tablet PC (not shown), and a server (not shown).

According to an embodiment of the present disclosure, the sub-communication module 330 includes at least one of a wireless Local Area Network (LAN) module 331 and a short-range communication module 332 (e.g., a Near-Field Communication (NFC) communication module). For example, the sub-communication module 330 can include one or both of the wireless LAN module 331 and the short-range communication module 332.

According to an embodiment of the present disclosure, the multimedia module 340 includes at least one of a broadcasting communication module 341, an audio reproduction module 342, and a moving image reproduction module 343.

According to an embodiment of the present disclosure, the camera module 350 includes at least one of a first camera 351 and a second camera 352.

According to an embodiment of the present disclosure, the input/output module 360 includes at least one of buttons 361, a microphone 362, a speaker 363, a vibration motor 364, the connector 365 and a keypad 366.

The controller 310 can include a Central Processing Unit (CPU) 311, a Read-Only Memory (ROM) 312 which stores a control program for controlling the apparatus 300 for recognizing a voice, and a Random Access Memory (RAM) 313 which stores a signal or data received from the outside of the apparatus 300 for recognizing a voice or is used as a memory area for a task performed by the apparatus 300 for recognizing a voice. The CPU 311 can include multiple processors. For example, the CPU 311 can include a single-core processor, a dual-core processor, a triple-core processor, a quad-core processor, and the like. The CPU 311, the ROM 312 and the RAM 313 can be interconnected by an internal bus.

The controller 310 controls the mobile communication module 320, the sub-communication module 330, the multimedia module 340, the camera module 350, the GPS module 355, the input/output module 360, the sensor module 370, the storage unit 375, the power supply unit 380, the display unit 390, and the display unit controller 395.

According to the control of the controller 310, the mobile communication module 320 allows the apparatus 300 for recognizing a voice to be connected to an external device through mobile communication by using at least one antenna or multiple antennas (not shown). The mobile communication module 320 transmits and receives wireless signals for voice calls, video calls, Short Message Service (SMS) messages, a Multimedia Messaging Service (MMS) messages, and the like to/from a mobile phone (not shown), a smart phone (not shown), a tablet PC or another device (not shown), which has a telephone number input to the apparatus 300 for recognizing a voice.

According to the control of the controller 310, the wireless LAN module 331 can be connected to the Internet at a place where a wireless Access Point (AP) (not shown) is installed. The wireless LAN module 331 supports a wireless LAN standard (e.g., IEEE 802.11x of the Institute of Electrical and Electronics Engineers (IEEE)). According to the control of the controller 310, the short-range communication module 332 enables the apparatus 300 for recognizing a voice to perform short-range wireless communication with an image forming device (not shown). Short-range communication schemes can include Bluetooth, Infrared Data Association (IrDA), and the like.

According to varying embodiments of the present disclosure, the apparatus 300 for recognizing a voice can include at least one of the mobile communication module 320, the wireless LAN module 331 and the short-range communication module 332, or any combination thereof. Also, a combination of the mobile communication module 320, the wireless LAN module 331 and the short-range communication module 332 can be referred to as a "communication module."

The multimedia module 340 can include the broadcasting communication module 341, the audio reproduction module 342, and/or a moving image reproduction module 343. According to the control of the controller 310, the broadcasting communication module 341 receives a broadcast signal (e.g., a TV broadcast signal, a radio broadcast signal, a data broadcast signal, etc.) and additional broadcast information (e.g., an Electronic Program Guide (EPG) or an Electronic Service Guide (ESG)), which are transmitted by a broadcast station through a broadcast communication antenna (not shown). According to the control of the controller 310, the audio reproduction module 342 reproduces stored or received digital audio files (e.g., a file having a file extension of mp3, wma, ogg, or way). According to the control of the controller 310, the moving image reproduction module 343 reproduces stored or received digital moving image files (e.g., a file having a file extension of mpeg; mpg, mp4, avi, mov, or mkv). The moving image reproduction module 343 can also reproduce digital audio files.

According to an embodiment of the present disclosure, the multimedia module 340 can include the audio reproduction module 342 and the moving image reproduction module 343, without including the broadcasting communication module 341. According to another embodiment of the present disclosure, the audio reproduction module 342 or the moving image reproduction module 343 of the multimedia module 340 can be included in the controller 310.

The camera module 350 includes at least one of the first camera 351 and the second camera 352, each for capturing a still image or a moving image according to the control of the controller 310. Also, the first camera 351 or the second camera 352 can include an auxiliary light source, such as a flash (not shown), which provides additional light to be used when capturing an image. The first camera 351 can be mounted on a front surface of the apparatus 300 for recognizing a voice, and the second camera 352 can be mounted on a rear surface of the apparatus 300 for recognizing a voice. Otherwise, the first camera 351 and the second camera 352 can be disposed adjacent to each other (e.g., a distance between the first camera 351 and the second camera 352 can be greater than 1 cm and is less than 8 cm), and, in such a configuration, the first camera 351 and the second camera 352 can capture a three-dimensional still image or a three-dimensional moving image.

The GPS module 355 receives a signal (e.g., a radio wave) from each of multiple GPS satellites (not shown) in the Earth's orbit, and calculates a location of the apparatus 300 for recognizing a voice by using a Time Of Arrival (TOA) from each of the GPS satellites (not shown) to the apparatus 300 for recognizing a voice. As described in more detail below, the controller 310 determines the type of a non-primary language by using a location of the apparatus 300 for recognizing a voice.

The input/output module 360 includes at least one input/output device, such as at least one of the multiple buttons 361, the microphone 362, the speaker 363, the vibration motor 364, the connector 365 and the keypad 366.

The buttons 361 can be formed on a front surface, a lateral surface or a rear surface of a housing of the apparatus 300 for recognizing a voice, and can include at least one of a power/lock button (not shown), a volume button (not shown), a menu button, a home button, a back button and a search button.

According to the control of the controller 310, the microphone 362 receives a voice or sound as input, and generates an electrical signal according to the received input.

According to the control of the controller 310, the speaker 363 outputs sounds matched to various signals (e.g., a wireless signal, a broadcast signal, a digital audio file, a digital moving image file, and photographing) from the mobile communication module 320, the sub-communication module 330, the multimedia module 340 and the camera module 350, to the outside of the apparatus 300 for recognizing a voice. The speaker 363 can output a sound (e.g., a button operation sound or a ring back tone matched to a telephone call) matched to a function that the apparatus 300 for recognizing a voice performs. The apparatus 300 for recognizing a voice can include multiple speakers. The speaker 363 or multiple speakers can be disposed at an appropriate position or appropriate positions of the housing of the apparatus 300 for recognizing a voice, in order to direct output sounds.

According to the control of the controller 310, the vibration motor 364 converts an electrical signal into a mechanical vibration. For example, when the apparatus 300 for recognizing a voice in a vibration mode receives a voice call from another device (not shown), the vibration motor 364 of the apparatus 300 for recognizing a voice can operate. The apparatus 300 for recognizing a voice can include multiple vibration motors. The vibration motor 364 or multiple vibration motors can be mounted within the housing of the apparatus 300 for recognizing a voice. The vibration motor 364 can operate in response to a touch action of a user who touches the display unit 390 and a continuous movement of a touch on the display unit 390.

The connector 365 is used as an interface for connecting the apparatus 300 for recognizing a voice to an external device (not shown) or a power source (not shown). According to the control of the controller 310, through a wired cable connected to the connector 365, the apparatus 300 for recognizing a voice transmits data stored in the storage unit 375 of the apparatus 300 for recognizing a voice to an external device (not shown) and/or receives data from the external device (not shown). Also, through the wired cable connected to the connector 365, the apparatus 300 for recognizing a voice can be supplied with power from the power source (not shown) or can charge a battery (not shown) by using the power source.

The keypad 366 receives key input from the user in order to control the apparatus 300 for recognizing a voice. The keypad 366 includes a physical keypad (not shown) installed on the front surface of the apparatus 300 for recognizing a voice and/or a virtual keypad (not shown) displayed by the display unit 390. According to an embodiment of the present disclosure, the physical keypad (not shown) installed on the front surface of the apparatus 300 for recognizing a voice can be omitted.

The sensor module 370 includes at least one sensor for detecting the state of the apparatus 300 for recognizing a voice. For example, the sensor module 370 can include a proximity sensor for detecting whether the user is close to the apparatus 300 for recognizing a voice, an illuminance sensor (not shown) for detecting the amount of light around the apparatus 300 for recognizing a voice, a motion sensor (not shown) for detecting the motion of the apparatus 300 for recognizing a voice (e.g., the rotation of the apparatus 300 for recognizing a voice, or acceleration or vibration applied to the apparatus 300 for recognizing a voice), and the like. At least one sensor can detect the state of the apparatus 300 for recognizing a voice, can generate a signal matched to the detection, and can transmit the generated signal to the controller 310. According to the performance of the apparatus 300 for recognizing a voice, sensors can be added to or removed from the sensor module 370.

According to the control of the controller 310, the storage unit 375 can store a signal or data which is input/output in response to an operation of each of the mobile communication module 320, the sub-communication module 330, the multimedia module 340, the camera module 350, the GPS module 355, the input/output module 360, the sensor module 370, and the display unit 390. The storage unit 375 can store a control program for controlling the apparatus 300 for recognizing a voice or a control program for the controller 310, and applications.

The term "storage unit" can refer to any one of or a combination of the storage unit 375, the ROM 312 and the RAM 313 within the controller 310, or a memory card (not shown), such as a Secure Digital (SD) card or a memory stick, which is mounted on the apparatus 300 for recognizing a voice. The storage unit can include a non-volatile memory, a volatile memory, a Hard Disk Drive (HDD), a Solid State Drive (SSD), and the like.

According to the control of the controller 310, the power supply unit 380 can supply power to one battery or multiple batteries (not shown) disposed in the housing of the apparatus 300 for recognizing a voice. The one battery or the multiple batteries (not shown) supply power to the apparatus 300 for recognizing a voice. Also, the power supply unit 380 can supply power provided by an external power source (not shown) to the apparatus 300 for recognizing a voice, through a wired cable connected to the connector 365.

The display unit 390 provides the user with a user interface matched to various services (e.g., telephone call, data transmission, broadcasting, and photography). The display unit 390 transmits an analog signal matched to at least one touch, which is input to the user interface, to the display unit controller 395. The display unit 390 can receive at least one touch as input from the user's body (e.g., fingers, thumbs, etc.) or an input means (e.g., a stylus pen) enabling a touch. Also, the display unit 390 can receive, as input, a continuous movement of one touch with respect to at least one touch. The display unit 390 can transmit an analog signal matched to a continuous movement of an input touch, to the display unit controller 395.

According to embodiments of the present disclosure, a touch is not limited to the touch of the user's body or the input means enabling a touch on the display unit 390, but can include a non-contact touch (e.g., a detectable distance between the display unit 390 and the user's body or the input means enabling a touch is less than or equal to 1 mm). In the display unit 390, a detectable distance can change depending on the performance or structure of the apparatus 300 for recognizing a voice.

According to an embodiment of the present disclosure, the display unit 390, for example, includes a first touch panel 390$a$ and a second touch panel 390$b$. The first touch panel 390$a$ can measure the touch or proximity of a part of the user's body. For example, the first touch panel 390$a$ can be implemented as a resistive touch screen, a capacitive touch screen, an infrared touch screen, a surface acoustic wave touch screen, and/or the like.

Meanwhile, the second touch panel 390$b$ can measure the touch or proximity of the touch or proximity of an input means, such as a stylus pen. For example, the second touch panel 390$b$ can be implemented in an ElectroMagnetic Radiation (EMR) measurement scheme.

The display unit controller 395 converts an analog signal received from the display unit 390 into a digital signal (e.g., X and Y coordinates), and provides the digital signal to the controller 310. The controller 310 controls the display unit 390 by using the digital signal received from the display unit controller 395. For example, in response to a touch, the controller 310 can control the display unit 390 to select or execute a shortcut icon (not shown) displayed on the display unit 390. According to an embodiment of the present disclosure, the display unit controller 395 can be included in the controller 310. The display unit controller 395, for example, includes a first touch panel controller 395$a$ which controls the first touch panel 390$a$, and a second touch panel controller 395$b$ which controls the second touch panel 390$b$.

Meanwhile, the controller 310 detects various user inputs received by the camera module 350, the input/output module 360, the sensor module 370, and the like as well as the display unit 390. Examples of the user inputs can include multiple pieces of information in various forms, such as a touch of the user, a gesture of the user, a voice of the user, the movement of the pupils of the user's eyes, a biomedical signal of the user, and the like, which are input to the apparatus 300 for recognizing a voice. The controller 310 controls the apparatus 300 for recognizing a voice by and large to perform a predetermined operation or function matched to the detected user input.

Figure 4:
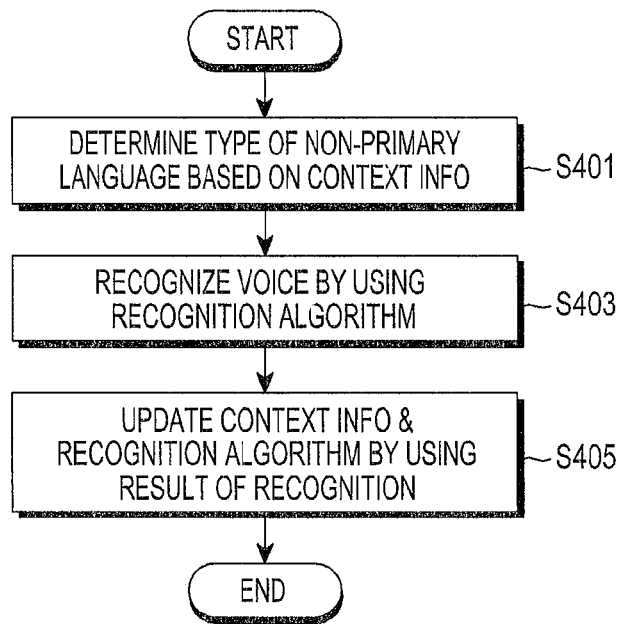
FIG. 4 is a flowchart illustrating a method for recognizing a voice according to an embodiment of the present disclosure.

FIG. 4 is a flowchart illustrating a method for recognizing a voice according to an embodiment of the present disclosure.

Referring to FIG. 4, the apparatus for recognizing a voice determines the type of non-primary language based on context information, in step S401. The apparatus for recognizing a voice recognizes a voice in the non-primary language by using a voice recognition algorithm matched to the determined type of the non-primary language, in step S403. Meanwhile, the apparatus for recognizing a voice updates at least one of the context information and the voice recognition algorithm by using a result of recognizing the voice, in step S405.

For example, as described above, in an embodiment of the present disclosure as illustrated in FIG. 1 and FIGS. 2A to 2D, the phonemes "ch," "u," "s," "aw" and "k" are recognized as "Chuseok" in Korean, and a non-primary language database is updated. When the phonemes "ch," "u," "s," "aw" and "k" are received as input, the apparatus for recognizing a voice immediately applies an algorithm for recognizing a voice in Korean, to the received phonemes "ch," "u," "s," "aw" and "k." Otherwise, when the phonemes "ch," "u," "s," "aw" and "k" are received as input, the apparatus for recognizing a voice can immediately recognize the received phonemes "ch," "u," "s," "aw" and "k" as "Chuseok" in Korean. As described above, an embodiment of the present disclosure can provide the method for recognizing a voice, which is characterized for each user. In the present example, a case is described in which an American who is not familiar with Korean pronounces "Chuseok" not as the phonemes "ch," "u," "s," "aw" and "k" but as the phonemes "ch," "u," "s," "o" and "k." In this case, the apparatus for recognizing a voice recognizes the phonemes "ch," "u," "s," "o" and "k" as "Chuseok" in the method as described with reference to FIG. 1, and information such that the phonemes "ch," "u," "s," "o" and "k" corresponds to "Chuseok" is used to update the non-primary language database. Thereafter, even when the identical user again inputs the phonemes "ch," "u," "s," "o" and "k," the apparatus for recognizing a voice can immediately apply the algorithm for recognizing a voice in Korean, to the phonemes "ch," "u," "s," "o" and "k," or can immediately recognize the phonemes "ch," "u," "s," "o" and "k" as "Chuseok" in Korean. Accordingly, in the method for recognizing a voice according to an embodiment of the present disclosure, the apparatus for recognizing a voice quickly determines that pronunciation different for each user belongs to a non-primary language, and recognizes the pronunciation different for each user.

Figure 5:
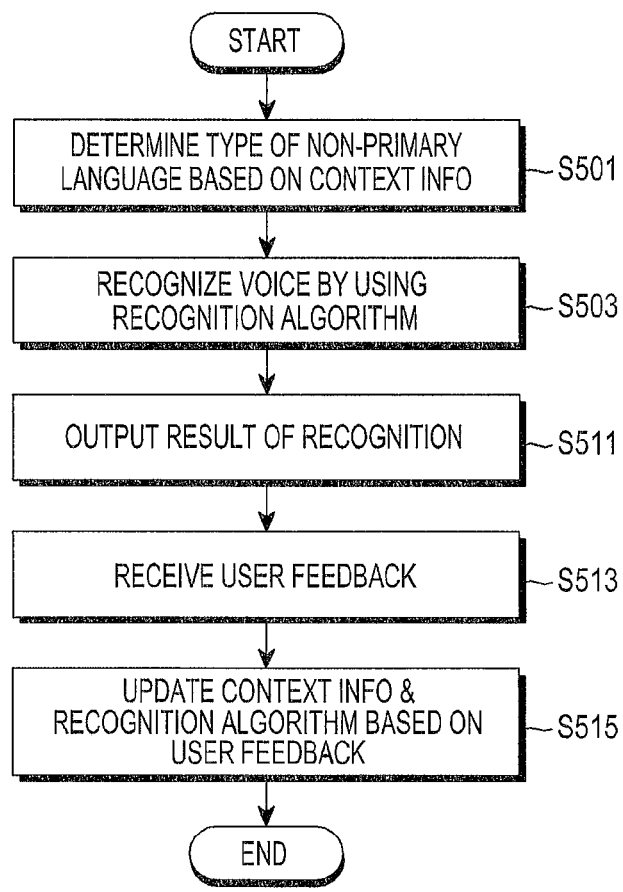
FIG. 5 is a flowchart illustrating in detail a method for recognizing a voice according to an embodiment of the present disclosure.

FIG. 5 is a flowchart illustrating in detail a method for recognizing a voice according to an embodiment of the present disclosure. An embodiment of the present disclosure as illustrated in FIG. 5 will be described in more detail below with reference to FIGS. 6A to 6F. FIGS. 6A to 6F are conceptual views of an apparatus for recognizing a voice, illustrating a method for recognizing a voice, according to an embodiment of the present disclosure.

Referring to FIG. 5, the apparatus for recognizing a voice determines the type of non-primary language based on context information, in step S501. The apparatus for recognizing a voice recognizes a voice in the non-primary language by using a voice recognition algorithm matched to the determined type of the non-primary language, in step S503.

The apparatus for recognizing a voice receives, as input, a voice involving multiple languages and outputs a result of recognizing the voice, in step S511.

Figure 6A:
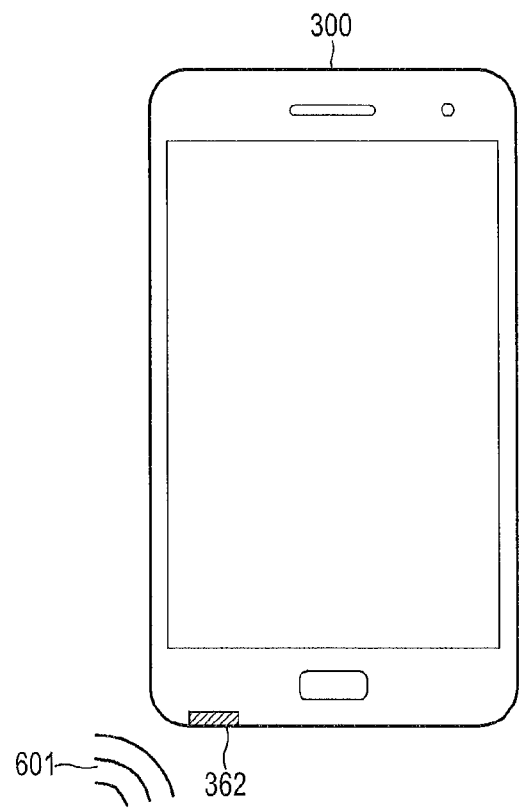
FIGS. 6A to 6F are conceptual views of an apparatus for recognizing a voice, illustrating a method for recognizing a voice, according to an embodiment of the present disclosure.

For example, as illustrated in FIG. 6A, the apparatus 300 for recognizing a voice receives, as input, a voice 601 involving multiple languages through the microphone 362. In the present example, the voice 601 includes the phonemes "h," "au," "w," "a," "z," "yo," "rr," "ch," "u," "s," "aw," "k," "h," "aw," "l," "i," "d," "e" and "i."

Figure 6B:
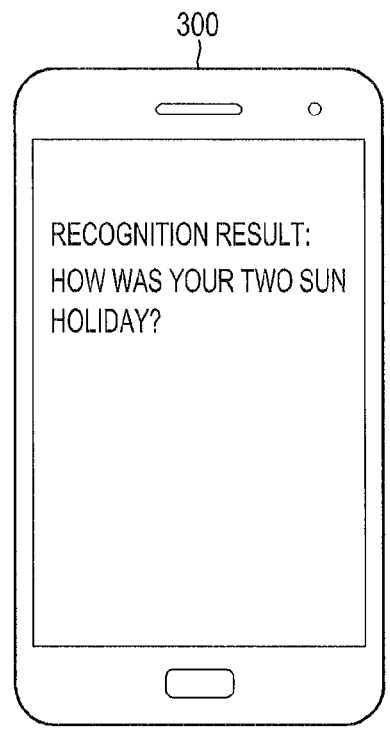

Then, as illustrated in FIG. 6B, the apparatus for recognizing a voice displays text corresponding to the input voice, on the display unit. Referring to FIG. 6B, the apparatus for recognizing a voice displays that a result of the recognition is "How was your two sun holiday?". As illustrated in FIG. 6B, the apparatus 300 for recognizing a voice misrecognizes the phonemes "ch," "u," "s," "aw" and "k" as the English word "two sun" and outputs the English word "two sun" at a position matched to the phonemes "ch," "u," "s," "aw" and "k."

Figure 6C:
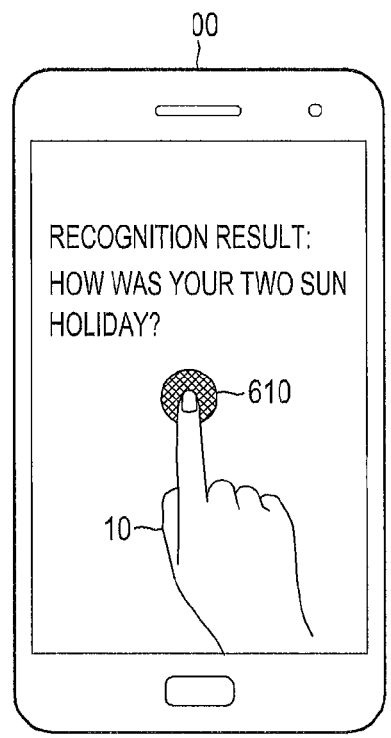

The apparatus for recognizing a voice receives, as input, a user feedback on a result of the recognition, in step S513. Here, the user feedback can be a user feedback indicating whether the result of the recognition is appropriate or inappropriate. In response to a result of the misrecognition as illustrated in FIG. 6B, the user inputs a user feedback indicating that the result of the recognition is inappropriate. For example, as illustrated in FIG. 6C, the user inputs a gesture 610 which touches the display unit twice, and thereby inputs the user feedback indicating that the result of the recognition is inappropriate. Meanwhile, the gesture 610 which touches the display unit twice is described for illustrative purposes only, and those skilled in the art will easily understand that there is no limitation on a method for inputting a user feedback.

Otherwise, the user can indicate only a misrecognized part. For example, the user can input a drag gesture at a part of the screen where "two sun" is displayed. The apparatus for recognizing a voice identifies that an error occurs in recognizing the phonemes "ch," "u," "s," "aw" and "k" matched to "two sun" on which the user feedback has been input.

The apparatus for recognizing a voice updates at least one of the context information and the voice recognition algorithm based on the input user feedback, in step S515. For example, in FIG. 6C, the apparatus for recognizing a voice updates at least one of the context information and the voice recognition algorithm based on information on the error in recognizing the phonemes "ch," "u," "s," "aw" and "k" as the English word "two sun."

Figure 6D:
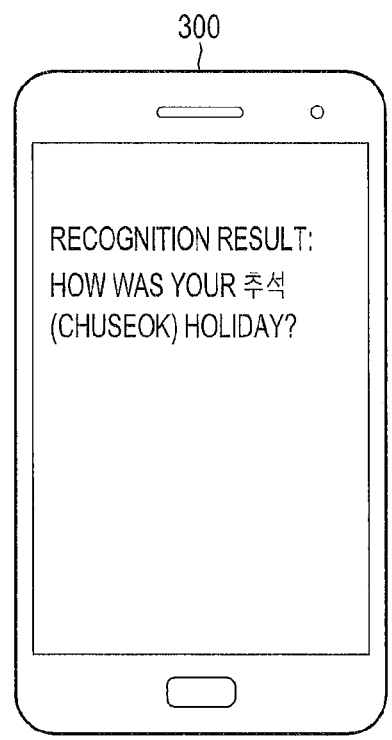
Figure 6E:
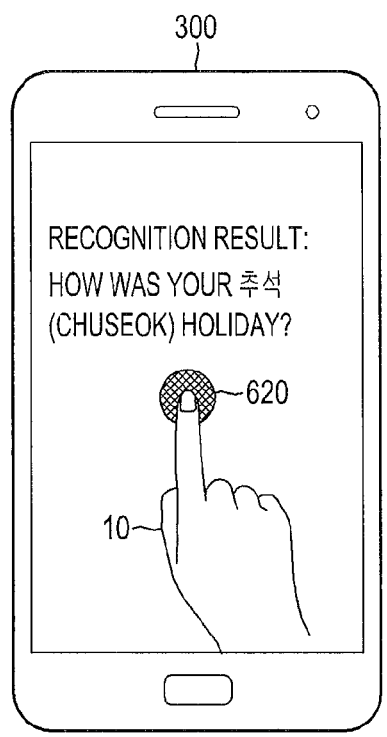
Figure 6F:
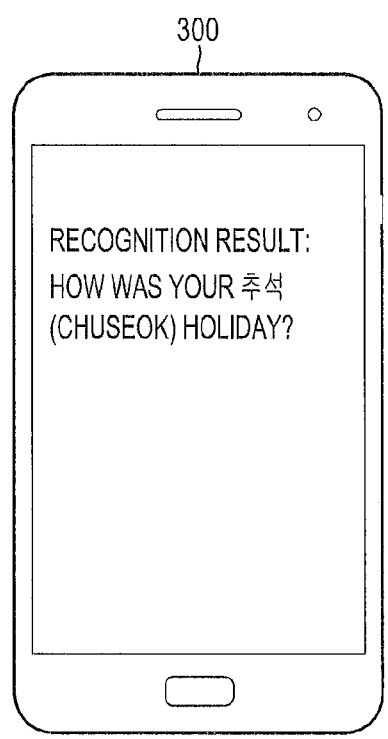

Meanwhile, the apparatus for recognizing a voice can re-recognize the input voice and, for example, can display a result of the re-recognition as illustrated in FIG. 6D. Referring to FIG. 6D, the apparatus for recognizing a voice displays that the result of the recognition is "How was your Chuseok holiday?". Referring to FIG. 6E, the user can input a user feedback such that the result of the recognition is appropriate, by touching the display unit once as denoted by reference numeral 620. In response to the input user feedback, the apparatus for recognizing a voice can finalize and display the result of the recognition, as illustrated in FIG. 6F.

The apparatus for recognizing a voice updates at least one of the context information and the voice recognition algorithm based on information such that the recognition of the phonemes "ch," "u," "s," "aw" and "k" as the Korean word "Chuseok" is appropriate. Accordingly, subsequently, when the phonemes "ch," "u," "s," "aw" and "k" are received as input, while excluding the English word "two sun" from a result of the recognition, the apparatus for recognizing a voice immediately recognizes the phonemes "ch," "u," "s," "aw" and "k" as the Korean word "Chuseok" and provides the Korean word "Chuseok" which has been recognized from the phonemes "ch," "u," "s," "aw" and "k."

As described above, the apparatus for recognizing a voice updates the non-primary language database based on the result of recognizing the voice. The apparatus for recognizing a voice can update the non-primary language database based on the user feedback. In contrast, the apparatus for recognizing a voice can update the non-primary language database without being based on the user feedback.

Figure 7:
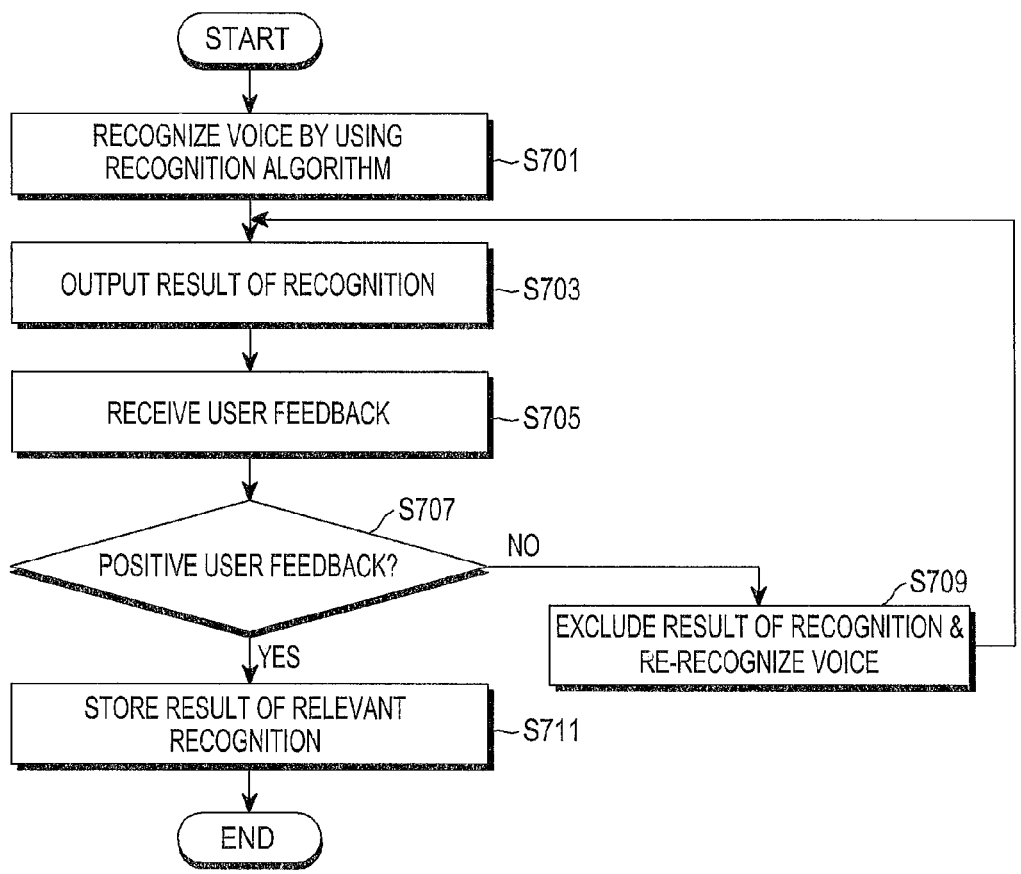
FIG. 7 is a flowchart illustrating a method for recognizing a voice according to another embodiment of the present disclosure.

FIG. 7 is a flowchart illustrating a method for recognizing a voice according to another embodiment of the present disclosure.

The apparatus for recognizing a voice determines the type of non-primary language based on context information and recognizes an input voice, in step S701. The apparatus for recognizing a voice outputs a result of the recognition, in step S703. The apparatus for recognizing a voice receives, as input, a user feedback indicating that the result of the recognition is appropriate or inappropriate, in step S705. When the user feedback indicates that the result of the recognition is appropriate (Yes in step S707), the apparatus for recognizing a voice updates a non-primary language database based on the result of the relevant recognition, in step S711. When the user feedback indicates that the result of the recognition is inappropriate (No in step S707), in step S709, the apparatus for recognizing a voice excludes the result of the relevant recognition from the non-primary language database, and re-recognizes the input voice.

The above-described process enables the implementation of a method for recognizing a voice, which is characterized for each user. The apparatus for recognizing a voice can differently set a method for recognizing a voice, for each user. Otherwise, the apparatus for recognizing a voice can transmit a method for recognizing a voice, which is characterized for a particular user, to another apparatus for recognizing a voice. Accordingly, even when the particular user uses another apparatus for recognizing a voice, the particular user can use the method for recognizing a voice, which is characterized for the particular user, without any change. Otherwise, the apparatus for recognizing a voice can receive the method for recognizing a voice, which is characterized for the particular user, from the outside, and can use it. In other words, the method for recognizing a voice can transmit the non-primary language database to the outside, or can receive the non-primary language database from the outside.

Figure 8:
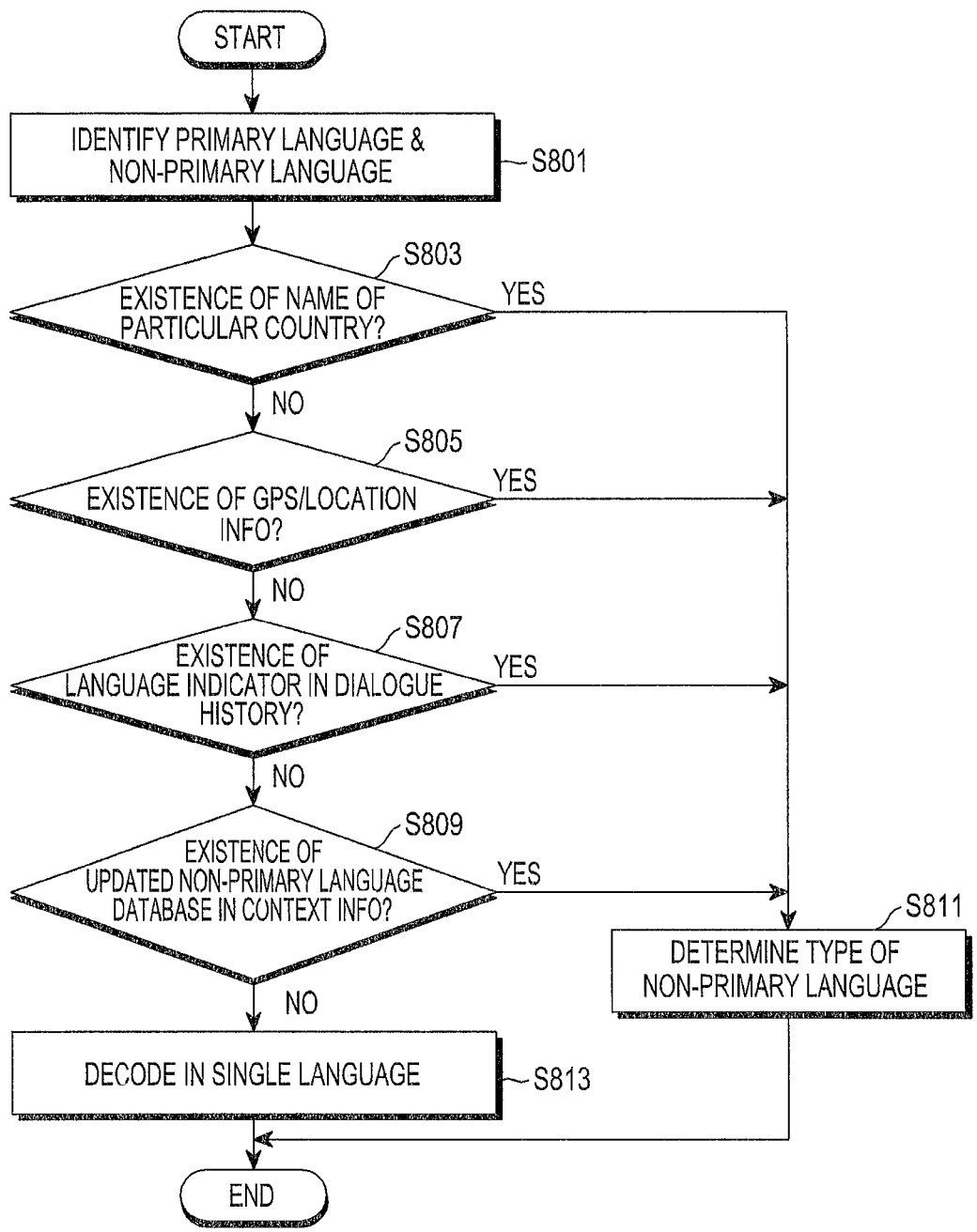
FIG. 8 is a flowchart illustrating a process for determining the type of non-primary language based on various pieces of context information in a method for recognizing a voice, according to embodiments of the present disclosure.

FIG. 8 is a flowchart illustrating a process for determining the type of non-primary language based on various pieces of context information in a method for recognizing a voice, according to embodiments of the present disclosure. Hereinafter, the process for determining the type of non-primary language based on various pieces of context information will be described with reference to FIG. 8.

The apparatus for recognizing a voice identifies a primary language and a non-primary language, from an input voice, in step S801.

The apparatus for recognizing a voice determines whether the name of a country is mentioned within one sentence, in step S803. When the apparatus for recognizing a voice determines that the name of the country is mentioned (Yes in step S803-Y), the apparatus for recognizing a voice can determine that a language of the relevant country is the type of non-primary language, in step S811.

In the present example, a case is described in which the user inputs the user's voice saying "Are there any direct flights from Incheon, South Korea to Reykjavik, Iceland'?" to the apparatus for recognizing a voice. Also, the apparatus for recognizing a voice sets English as a primary language. The apparatus for recognizing a voice identifies that "Incheon" and "Reykjavik" belong to the non-primary language. Meanwhile, the apparatus for recognizing a voice determines that the name of a country "South Korea" and the name of a country "Iceland" are mentioned in the input voice. Accordingly, the apparatus for recognizing a voice determines that the type of a non-primary language to which "Incheon" which is adjacent to "South Korea" belongs is Korean, and determines that the type of a non-primary language to which "Reykjavik" which is adjacent to "Iceland" belongs is Icelandic. The apparatus for recognizing a voice determines whether Global Positioning System (GPS) coordinates or location information exists, in step S805. When the GPS coordinates or location information exists (Yes in step S805), the apparatus for recognizing a voice determines the type of non-primary language based on the GPS coordinates or location information, in step S811. Meanwhile, a terminal device can transmit the input voice to a server, and then the server can recognize the input voice. In this example, the server can receive GPS coordinates of the terminal device. Also, the server can determine the type of non-primary language based on the received GPS coordinates of the terminal device.

For example, the apparatus for recognizing a voice identifies a country, where the apparatus for recognizing a voice is located, by using the GPS coordinates. When a language of the identified country is not set as a primary language, the apparatus for recognizing a voice determines that the language of the identified country is a non-primary language. Also, the apparatus for recognizing a voice determines which place the apparatus for recognizing a voice is located in, by using characteristics of the place. For example, when a place where the apparatus for recognizing a voice is located is a French restaurant, the apparatus for recognizing a voice determines that a non-primary language is French. The apparatus for recognizing a voice can identify the location information by using GPS coordinates, or can identify the location information based on Wi-Fi channel characteristics, an identifier, and/or the like, which are recognized by the sub-communication module 330.

The apparatus for recognizing a voice determines whether a dialogue history includes a language indicator, in step S807. When the dialogue history includes the language indicator (Yes in step S807), the apparatus for recognizing a voice determines the type of non-primary language based on the dialogue history, in step S811. More specifically, the apparatus for recognizing a voice determines whether the dialogue history includes the name of a particular country. When a language matched to the name of the particular country is not a primary language, the apparatus for recognizing a voice determines that the language matched to the name of the particular country corresponds to the type of non-primary language.

For example, the user has a dialogue with the apparatus for recognizing a voice. The apparatus for recognizing a voice provides an output matched to a voice that the user has input. Specifically, the user can input the user's voice saying "Which city will hold the winter Olympics in 2018?". The apparatus for recognizing a voice recognizes the input voice, and analyzes what the input voice signifies. The apparatus for recognizing a voice provides an output matched to a voice that the user has input, and, for example, can provide the output "Pyeongchang, the Republic of Korea." The apparatus for recognizing a voice can provide "Pyeongchang, the Republic of Korea" displayed in the form of text. Otherwise, the apparatus for recognizing a voice can provide "Pyeongchang, the Republic of Korea" in the form of voice based on TTS. The apparatus for recognizing a voice stores a dialogue history between itself and the user. Particularly, the apparatus for recognizing a voice stores one sentence including the word "the Republic of Korea" and the word "Pyeongchang" and stores phonemes corresponding Republic of Korea" and phonemes corresponding to "Pyeongchang."

Thereafter, when the apparatus for recognizing a voice receives as input a voice having the phonemes corresponding to "Pyeongchang" as phonemes of a non-primary language, the apparatus for recognizing a voice determines that the type of a non-primary language to which "Pyeongchang" belongs is Korean, and applies the algorithm for recognizing a voice in Korean, to "Pyeongchang."

The apparatus for recognizing a voice determines whether an updated non-primary language database exists, in step S809. When the updated non-primary language database exists (Yes in step S809), the apparatus for recognizing a voice determines the type of non-primary language based on the updated non-primary language database, in step S811. More specifically, the apparatus for recognizing a voice determines whether a history of recognizing the non-primary language exists in the non-primary language database. When the history of recognizing the non-primary language exists in the non-primary language database, the apparatus for recognizing a voice immediately recognizes the non-primary language based on a result of the recognition corresponding to the history, and outputs a result of recognizing the non-primary language.

The method for determining the type of a non-primary language based on the updated non-primary language database has been described with reference to FIG. 5. As described above, the method for recognizing a voice according to an embodiment of the present disclosure can be implemented as a voice recognition method characterized for each user. Particularly, the method for recognizing a voice according to an embodiment of the present disclosure can be implemented as a voice recognition method which is based on at least one of a sound, a grammar/language pattern and a behavior pattern of each user, and which is characterized for each user.

For example, the sound of the user is related to voice characteristics, and is measured by modeling an independent phoneme model, that each user pronounces, or a probability of the occurrence of a phoneme. Also, the grammar/language pattern is measured by identifying the grammar of the final decoded text. Also, the behavior pattern can be related to a manner in which each user speaks multiple languages.

As described above, the method for recognizing a voice according to an embodiment of the present disclosure detects the type of non-primary language based on various pieces of context information.

Figure 9:
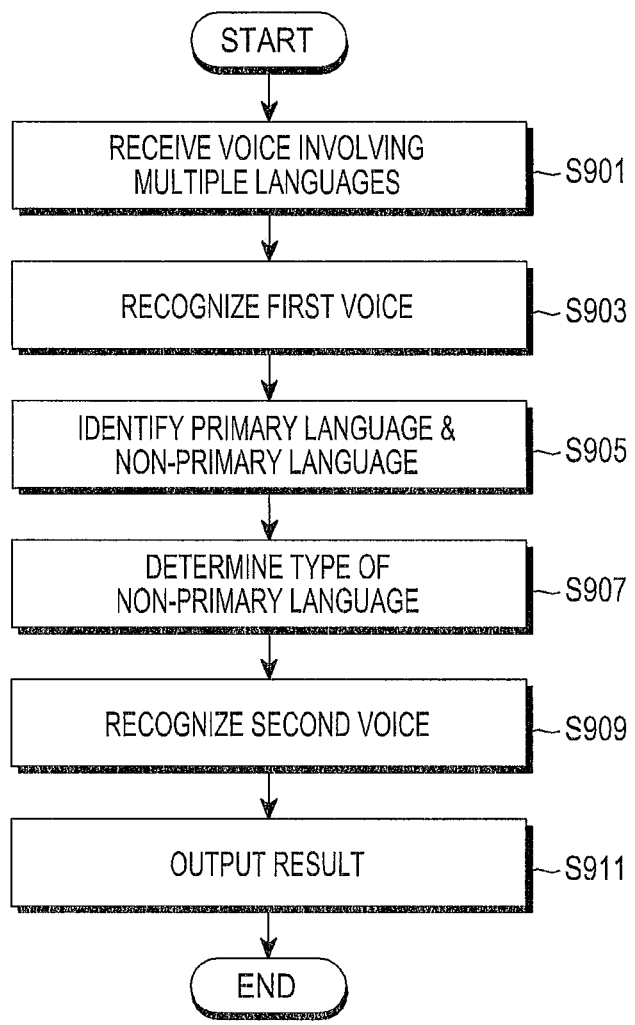
FIG. 9 is a flowchart illustrating a method for recognizing a voice involving multiple languages according to embodiments of the present disclosure.

FIG. 9 is a flowchart illustrating a method for recognizing a voice involving multiple languages according to embodiments of the present disclosure.

Referring to FIG. 9, the apparatus for recognizing a voice receives, as input, a voice involving multiple languages, in step S901. In an embodiment of the present disclosure as illustrated in FIG. 9, the voice covers a first language and a second language. The apparatus for recognizing a voice sets the first language as a primary language. In step S903, the apparatus for recognizing a voice recognizes a first voice of the input voice by using a first voice recognition algorithm which is a voice recognition algorithm matched to the first language which has been set as the primary language.

The apparatus for recognizing a voice identifies a primary language and a non-primary language based on a result of recognizing the first voice, in step S905. For example, as described above, the apparatus for recognizing a voice determines that each phoneme having a similarity less than a preset threshold belongs to the non-primary language, based on a similarity of each phoneme which is based on the first voice recognition algorithm.

The apparatus for recognizing a voice determines the type of the non-primary language in step S907, and for example, determines that the type of the non-primary language is the second language. The apparatus for recognizing a voice recognizes a second voice of the input voice by using a second voice recognition algorithm matched to the second language, in step S909. The apparatus for recognizing a voice outputs a result of recognizing the voice, which is based on a result of recognizing the first voice and a result of recognizing the second voice, in step S911.

Figure 10:
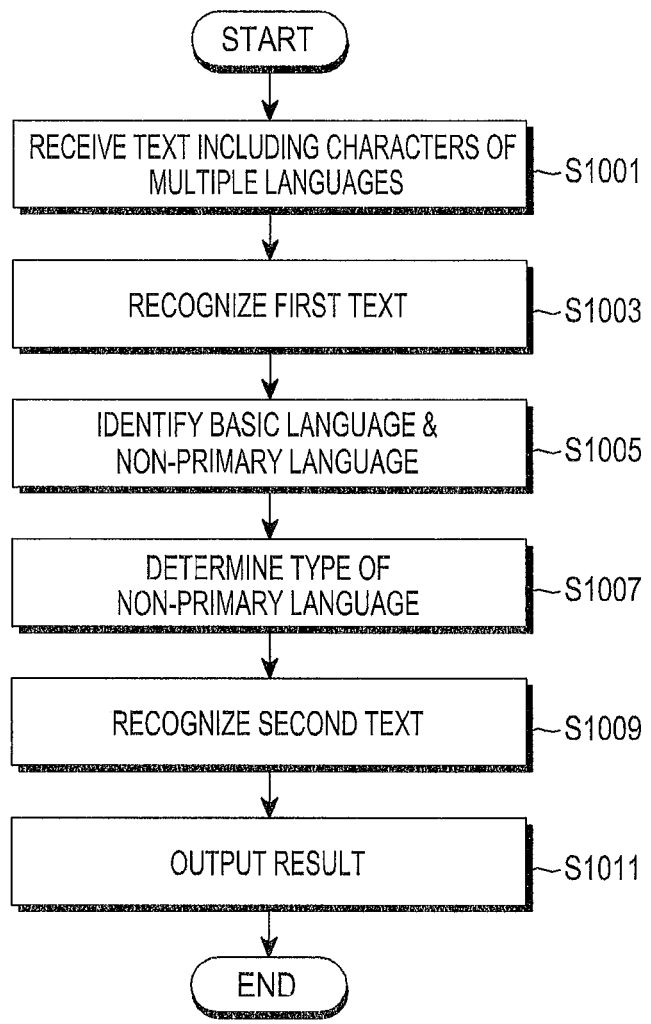
FIG. 10 is a flowchart illustrating a Text To Speech (TTS) method according to embodiments of the present disclosure.

FIG. 10 is a flowchart illustrating a Text To Speech (TTS) method according to embodiments of the present disclosure.

An apparatus for recognizing text receives, as input, text including characters of multiple languages, in step S1001. In an embodiment of the present disclosure as illustrated in FIG. 10, the text includes characters of a first language and characters of a second language. The apparatus for recognizing text sets the first language as a primary language. In step S1003, the apparatus for recognizing text recognizes first text of the input text by using a first text recognition algorithm which is a text recognition algorithm matched to the first language which has been set as the primary language.

The apparatus for recognizing text identifies a primary language and a non-primary language based on a result of recognizing the first text, in step S1005. For example, an apparatus for recognizing text determines that each character having a similarity less than a preset threshold belongs to the non-primary language, based on a similarity of each character which is based on the first text recognition algorithm.

The apparatus for recognizing text determines the type of the non-primary language in step S1007, and for example, determines that the type of the non-primary language is the second language. The apparatus for recognizing text determines the type of non-primary language, similarly to the method for recognizing a voice as described above. For example, the apparatus for recognizing text can determine the type of non-primary language based on whether the input text includes the name of a particular country, whether a text log history includes a language indicator, context information, and/or GPS/location information.

The apparatus for recognizing text recognizes second text of the input text by using a second text recognition algorithm matched to the second language, in step S1009. The apparatus for recognizing text outputs a result of recognizing the text, which is based on a result of recognizing the first text and a result of recognizing the second text, in step S1011. Particularly, the apparatus for recognizing text outputs the result of recognizing the first text and the result of recognizing the second text, in the form of voice.

It can be appreciated that the embodiments of the present disclosure can be implemented in software, hardware, or a combination thereof. Any such software can be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. Also, it will be appreciated that the exemplary embodiments of the present disclosure can be implemented by a computer or a portable terminal which includes a control unit and a memory, in which the memory can be an example of a storage medium that is readable by a machine that is suitable for storing one or more programs that include instructions for implementing the exemplary embodiments of the present disclosure. Accordingly, the present disclosure includes a program for a code implementing the apparatus and method described in the appended claims of the specification and a machine (a computer or the like)-readable storage medium for storing the program. Moreover, such a program as described above can be electronically transferred through an arbitrary medium such as a communication signal transferred through cable or wireless connection, and the present disclosure properly includes the things equivalent to that.

Further, the device can receive the program from a program providing apparatus connected to the device wirelessly or through a wire and store the received program. The program supply apparatus can include a program that includes instructions to execute the exemplary embodiments of the present disclosure, a memory that stores information or the like required for the exemplary embodiments of the present disclosure, a communication unit that conducts wired or wireless communication with the electronic apparatus, and a control unit that transmits a corresponding program to a transmission/reception apparatus in response to the request from the electronic apparatus or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of recognizing a voice input signal involving multiple languages, the method comprising:
   receiving the voice input signal which is input by a user;
   recognizing the voice input signal by using a voice recognition algorithm for a primary language of the multiple languages;
   identifying a segment of the voice input signal, which is in a non-primary language, in the voice input signal based on the recognition for the primary language;
   determining a language of the segment of the voice input signal based on context information;
   recognizing the segment of the voice input signal by using a voice recognition algorithm for the determined; and
   outputting a recognition result of the voice input signal which is based on the recognition for the primary language and the recognition for the determined language.

2. The method as claimed in claim 1, wherein the context information comprises at least one of:
   whether a name of a country exists within the voice input signal;
   information on a place where an apparatus for recognizing the voice input signal is located;
   dialogue history information; and
   an updated non-primary language database.

3. The method as claimed in claim 2, wherein determining the language of the segment of the voice input signal based on the context information comprises:
   determining that a language for the name of the country is the language of the segment of the voice input signal, if the language for the name of the country is not the primary language, when the name of the country exists within the voice input signal.

4. The method as claimed in claim 2, wherein determining the language of the segment of the voice input signal based on the context information comprises:
   determining that the language of the segment of the voice input signal is a language for at least one of characteristics of a country and a place where the apparatus for recognizing the voice input signal is located, based on measured Global Positioning System (GPS) coordinates.

5. The method as claimed in claim 2, wherein determining the language of the segment of the voice input signal based on the context information comprises:
   determining whether a dialogue history in which the language of the segment of the voice input signal and the name of the country co-exist has previously been stored; and
   determining that the language of the segment of the voice input signal is a language for the name of the country, when there exists the dialogue history in which the language of the segment of the voice input signal and the name of the country co-exist.

6. The method as claimed in claim 2, wherein determining the language of the segment of the voice input signal based on the context information comprises:
   determining whether a history of recognizing the segment of the voice input signal exists in the non-primary language database; and
   immediately recognizing, by the apparatus for recognizing the voice input signal, the language of the segment of the voice input signal based on a result of the recognition corresponding to the history of recognizing the segment of the voice input, when the history of recognizing the segment of the voice input signal exists in the non-primary language database.

7. The method as claimed in claim 6, further comprising receiving the non-primary language database from an outside.

8. The method as claimed in claim 1, wherein identifying the segment of the voice input signal, which is in the non-primary language, in the voice input signal based on the recognition for the primary language comprises:
   segmenting the voice input signal in a unit of phoneme;
   determining a similarity between at least one segmented phoneme and a word in the primary language by matching the at least one segmented phoneme with a database of phonemes in the primary language; and
   identifying that the at least one segmented phoneme having the determined similarity less than a preset threshold belongs to the segment of the voice input signal.

9. The method as claimed in claim 1, further comprising updating at least one of the context information and a voice recognition algorithm for the language of the segment of the voice input signal, by reflecting a result of recognizing the segment of the voice input signal in the at least one of the context information and the voice recognition algorithm for the language of the segment of the voice input signal.

10. The method as claimed in claim 9, further comprising:
    displaying the result of recognizing the segment of the voice input signal;
    receiving, as an input, a user feedback indicating whether the result of recognizing the segment of the voice input signal is appropriate or inappropriate; and
    updating a non-primary language database by reflecting the result of recognizing the segment of the voice input signal in the non-primary language database, when the user feedback indicates that the result of recognizing the segment of the voice input signal is appropriate.

11. The method as claimed in claim 10, further comprising:
    when the user feedback indicates that the result of recognizing the segment of the voice input signal is inappropriate, excluding the result of recognizing the segment of the voice input signal; and re-recognizing the segment of the voice input signal, and outputting the re-recognized segment of the voice input signal.

12. An apparatus that recognizes a voice input signal involving multiple languages, the apparatus comprising:
a microphone configured to receive a voice input signal which is input by a user;
a storage unit configured to store a voice recognition algorithm for a primary language and a voice recognition algorithm for a non-primary language;
a controller configured to recognize the voice input signal by using the voice recognition algorithm for the primary language, identify a segment of the voice input signal, which is in the non- primary language, in the voice input signal based on the recognition for the primary language, determine a language of the segment of the voice input signal based on context information, and recognize the segment of the voice input signal by using a voice recognition algorithm for the determined language; and
a display unit configured to output a recognition result of the voice input signal which is based on the recognition for the primary language and the recognition for the determined language.

13. The apparatus as claimed in claim 12, wherein the context information comprises at least one of:
whether a name of a country exists within the voice input signal;
information on a place where an apparatus for recognizing the voice input signal is located;
dialogue history information; and
an updated non-primary language database.

14. The apparatus as claimed in claim 13, further comprising a Global Positioning System (GPS) module configured to measure GPS coordinates, where the apparatus configured to recognize the voice input signal is located, and output the measured GPS coordinates,
wherein the controller is configured to determine that a language for the name of the country is the language of the segment of the voice input signal, if the language for the name of the country is not the primary language, when the name of the country exists within the voice, or
wherein the controller is configured to determine that the language of the segment of the voice input signal is a language for at least one of characteristics of a country and a place where the apparatus for recognizing the voice input signal is located, based on the measured GPS coordinates.

15. The apparatus as claimed in claim 13, wherein the storage unit is configured to pre-store a dialogue history in which the language of the segment of the voice input signal and the name of the country co-exist, and the controller is configured to determine that the language of the segment of the voice input signal is a language for the name of the country, when the dialogue history includes the language of the segment of the voice input signal and the name of the country.

16. The apparatus as claimed in claim 15,
wherein the storage unit is configured to store the non-primary language database, and the controller is immediately configured to recognize the language of the segment of the voice input signal based on a result of the recognition corresponding to the history of recognizing the segment of the voice input signal, when the history of recognizing the segment of the voice input signal exists in the non-primary language database.

17. The apparatus as claimed in claim 12, wherein the storage unit is configured to store a database of phonemes in the primary language, and the controller is configured to segment the voice input signal in a unit of phoneme, determine a similarity between at least one segmented phoneme and a word in the primary language by matching the at least one segmented phoneme with the database of the phonemes in the primary language, and identify that the at least one segmented phoneme having the determined similarity less than a preset threshold belongs to the segment of the voice input signal.

18. The apparatus as claimed in claim 12, wherein the controller is configured to control the storage unit to update at least one of the context information and a voice recognition algorithm for the language of the segment of the voice input signal by reflecting a result of recognizing the segment of the voice input signal in the at least one of the context information and the voice recognition algorithm for the segment of the voice input signal,
wherein the display unit is configured to displaythe result of recognizing the segment of the voice input signal, and receive, as an input, a user feedback indicating whether the result of recognizing the segment of the voice input signal is appropriate or inappropriate,
wherein the controller is configured to control the storage unit to update a non-primary language database by reflecting the result of recognizing the segment of the voice input signal in the non-primary language database, when the user feedback indicates that the result of recognizing the segment of the voice input signal is appropriate,
wherein, when the user feedback indicates that the result of recognizing the segment of the voice input signal is inappropriate, the controller is configured to exclude the result of recognizing the segment of the voice input signal, and control the storage unit to re-recognize the-segment of the voice input signal and output the re-recognized segment of the voice input signal.

* * * * *